(12) United States Patent
Pfaff et al.

(10) Patent No.: US 8,485,234 B2
(45) Date of Patent: Jul. 16, 2013

(54) FUNNEL

(75) Inventors: Brian D. Pfaff, New Berlin, WI (US);
Kevin R. Krueger, Nashotah, WI (US);
Anthony J. Nicosia, Brookfield, WI
(US); James S. Graham, Cedarburg, WI
(US); Jonathan N. Barber, Waukesha,
WI (US)

(73) Assignee: Harley-Davidson Motor Company Group, LLC, Milwaukee, WI (US)

( * ) Notice: Subject to any disclaimer, the term of this patent is extended or adjusted under 35 U.S.C. 154(b) by 680 days.

(21) Appl. No.: 12/687,236

(22) Filed: Jan. 14, 2010

(65) Prior Publication Data

US 2011/0169243 A1    Jul. 14, 2011

(51) Int. Cl.
*B65B 39/00*    (2006.01)
*B67C 11/02*    (2006.01)

(52) U.S. Cl.
CPC ...................................... *B67C 11/02* (2013.01)
USPC ............................. 141/340; 141/86; 141/333

(58) Field of Classification Search
USPC ..................... 141/86, 331–345; 222/566–574
See application file for complete search history.

(56) References Cited

U.S. PATENT DOCUMENTS

| | | | |
|---|---|---|---|
| 129,303 A | 7/1872 | Wright | |
| 200,149 A | 2/1878 | Newman | |
| 952,313 A | 3/1910 | Droz | |
| 1,117,741 A | 11/1914 | Wood, Jr. | |
| 1,233,352 A | 7/1917 | Helcher | |
| 1,243,138 A | 10/1917 | Carroll | |
| 1,584,840 A | 5/1926 | Cammen | |
| 1,662,820 A | 3/1928 | Condupa | |
| 1,768,098 A | 6/1930 | Aulbach | |
| 1,952,288 A | 3/1934 | Saxon | |
| 2,116,979 A | 5/1938 | Moller | |
| 2,127,788 A | 8/1938 | Schmutzler | |
| 2,144,923 A | 1/1939 | Kester et al. | |
| 2,155,049 A | 4/1939 | Isaacson | |
| 2,179,400 A | 11/1939 | Casner | |
| 2,260,430 A | 10/1941 | Blasingame | |
| 2,411,384 A | 11/1946 | Miller et al. | |
| 2,555,868 A * | 6/1951 | Bowman | 141/86 |
| 2,564,962 A | 8/1951 | Dean | |
| 2,628,736 A | 2/1953 | Warneke | |
| 2,636,650 A | 4/1953 | Marrier | |
| 2,678,142 A | 5/1954 | Creed | |
| 2,767,891 A | 10/1956 | Beadles | |
| 2,807,944 A | 10/1957 | Glass | |
| 3,112,100 A * | 11/1963 | Prichard | 366/41 |
| 3,252,635 A | 5/1966 | Rosenhan | |
| 3,490,501 A | 1/1970 | Manem et al. | |
| 3,628,577 A | 12/1971 | Kruis | |
| 3,672,547 A | 6/1972 | Kozlowski | |
| 3,804,134 A | 4/1974 | Wehking | |

(Continued)

FOREIGN PATENT DOCUMENTS

GB        2252292 A        5/1992

*Primary Examiner* — Timothy L Maust
(74) *Attorney, Agent, or Firm* — Michael Best & Friedrich LLP

(57) ABSTRACT

A funnel for filling a container with liquid through an aperture in a side wall of the container includes a panel that has a fill spout. A rim is disposed on a lower edge of the panel and adapted to engage a lower inner surface of the side wall. A tab extends from the panel and is adapted to engage an outer surface of the side wall.

23 Claims, 7 Drawing Sheets

U.S. PATENT DOCUMENTS

| | | | |
|---|---|---|---|
| 3,987,943 A | 10/1976 | Richmond, Jr. | |
| 4,082,125 A * | 4/1978 | Wilson et al. | 141/86 |
| 4,108,222 A | 8/1978 | Kaufman | |
| 4,130,147 A | 12/1978 | Langlie et al. | |
| 4,299,340 A * | 11/1981 | Hrytzak | 222/189.07 |
| 4,347,878 A | 9/1982 | Schofield | |
| D288,520 S | 3/1987 | Bozarth | |
| 4,800,875 A | 1/1989 | Ray | |
| 4,913,201 A * | 4/1990 | Lucero et al. | 141/334 |
| 5,195,662 A * | 3/1993 | Neff | 222/108 |
| 5,433,256 A | 7/1995 | Vasers | |
| 5,480,072 A | 1/1996 | Ripley | |
| D468,169 S | 1/2003 | Tumbleson | |
| 6,698,468 B1 * | 3/2004 | Thompson | 141/86 |
| 7,207,466 B2 | 4/2007 | Walsh et al. | |
| 7,246,639 B2 * | 7/2007 | Kuntz | 141/86 |
| 7,308,920 B1 | 12/2007 | Theis et al. | |
| 2009/0120965 A1 | 5/2009 | Archer, Jr. | |
| 2009/0242432 A1 | 10/2009 | Grebe | |

* cited by examiner

FUNNEL

BACKGROUND

The present invention relates to funnels. More particularly, the invention relates to a funnel for directing a liquid into an aperture of a substantially vertical or upright surface.

SUMMARY

In one aspect, the invention provides an open-sided funnel for filling a container with liquid through an aperture. The open-sided funnel includes a panel including a fill spout, a rim disposed on a perimeter portion of the panel for engaging the interior of the container adjacent the aperture, and a tab. The tab is disposed on a perimeter portion of the panel for engaging the exterior of the container adjacent the aperture. The fill spout defines a half-funnel-shaped receiving area that is open to a top side of the fill spout and to a lateral side of the fill spout.

In another aspect, the invention provides an open-sided funnel for filling a container with liquid through an aperture. The open-sided funnel includes a panel including a liquid-receiving spout. A lip is disposed on a perimeter portion of the panel. The lip defines a radius and extending along an arc of between about 90 degrees and about 180 degrees and configured to extend through the aperture of substantially the same radius so that the lip rests against an interior edge of the aperture. A tab extends from the panel adjacent the lip. The tab is configured to inhibit the panel from passing through the aperture into the container. The panel is configured to obstruct the lower half of the aperture when viewed in a direction perpendicular to the aperture.

In yet another aspect, the invention provides a motorcycle including a frame, an engine and transmission assembly supported by the frame, and a container configured to contain a liquid during operation of the engine, the container having an aperture in a side wall thereof. The motorcycle further includes an open-sided funnel for filling the container with the liquid through the aperture. The open-sided funnel includes a panel including a fill spout, an arc-shaped rim disposed on a perimeter portion of the panel and engaged with the interior of the container adjacent the aperture, and a plurality of tabs. Each one of the plurality of tabs is disposed on a perimeter portion of the panel and engaged with the exterior of the container adjacent the aperture. The fill spout defines a half-funnel-shaped receiving area that is open to a top side of the fill spout and to a lateral side of the fill spout.

In yet another aspect, the invention provides a funnel for filling a container with liquid through an aperture in a side wall of the container. The funnel includes a panel that has a fill spout. A rim is disposed on a lower edge of the panel and adapted to engage a lower inner surface of the side wall. A tab extends from the panel and is adapted to engage an outer surface of the side wall.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
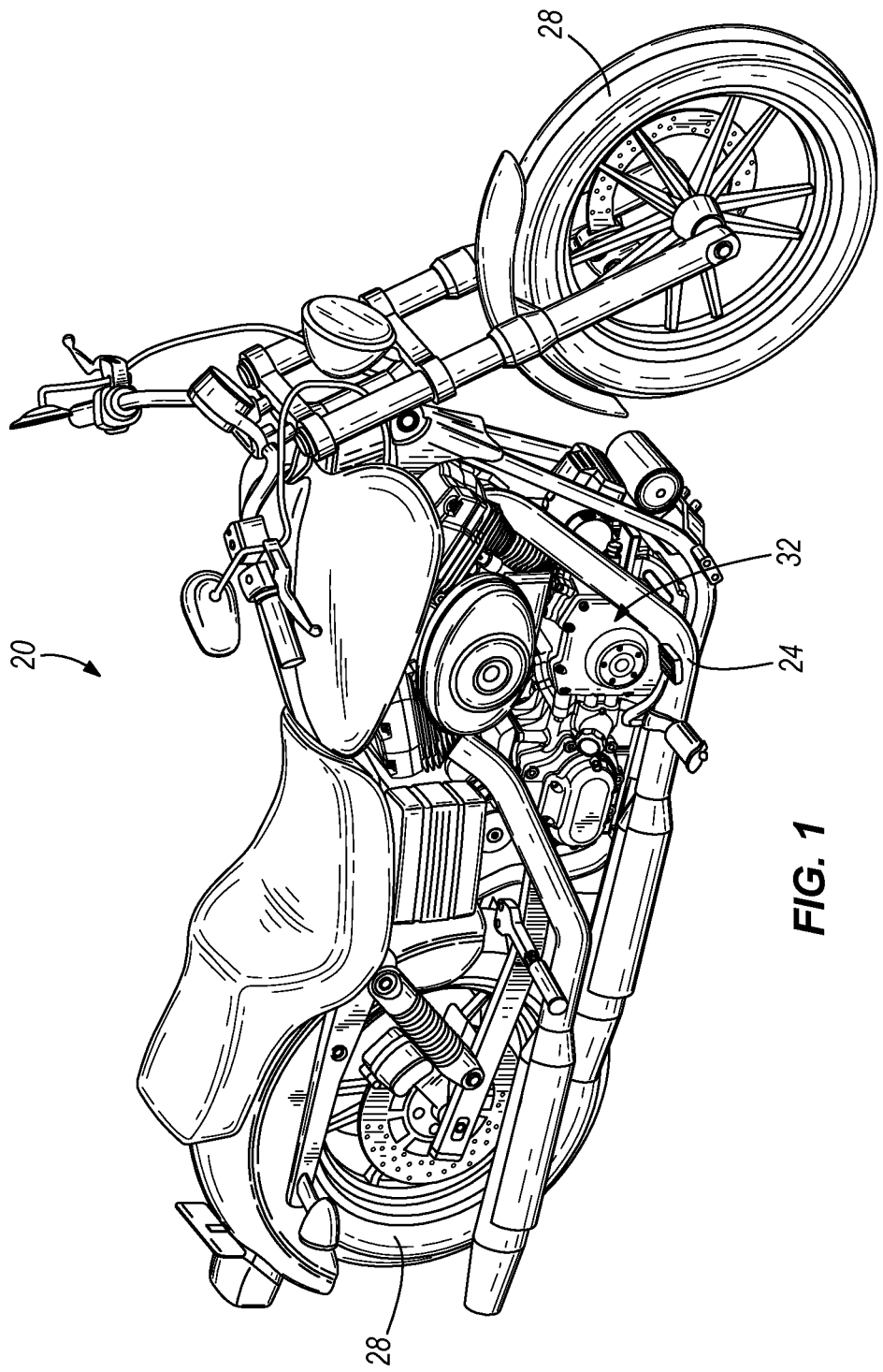
FIG. 1 is a perspective view of a motorcycle.
Figure 2:
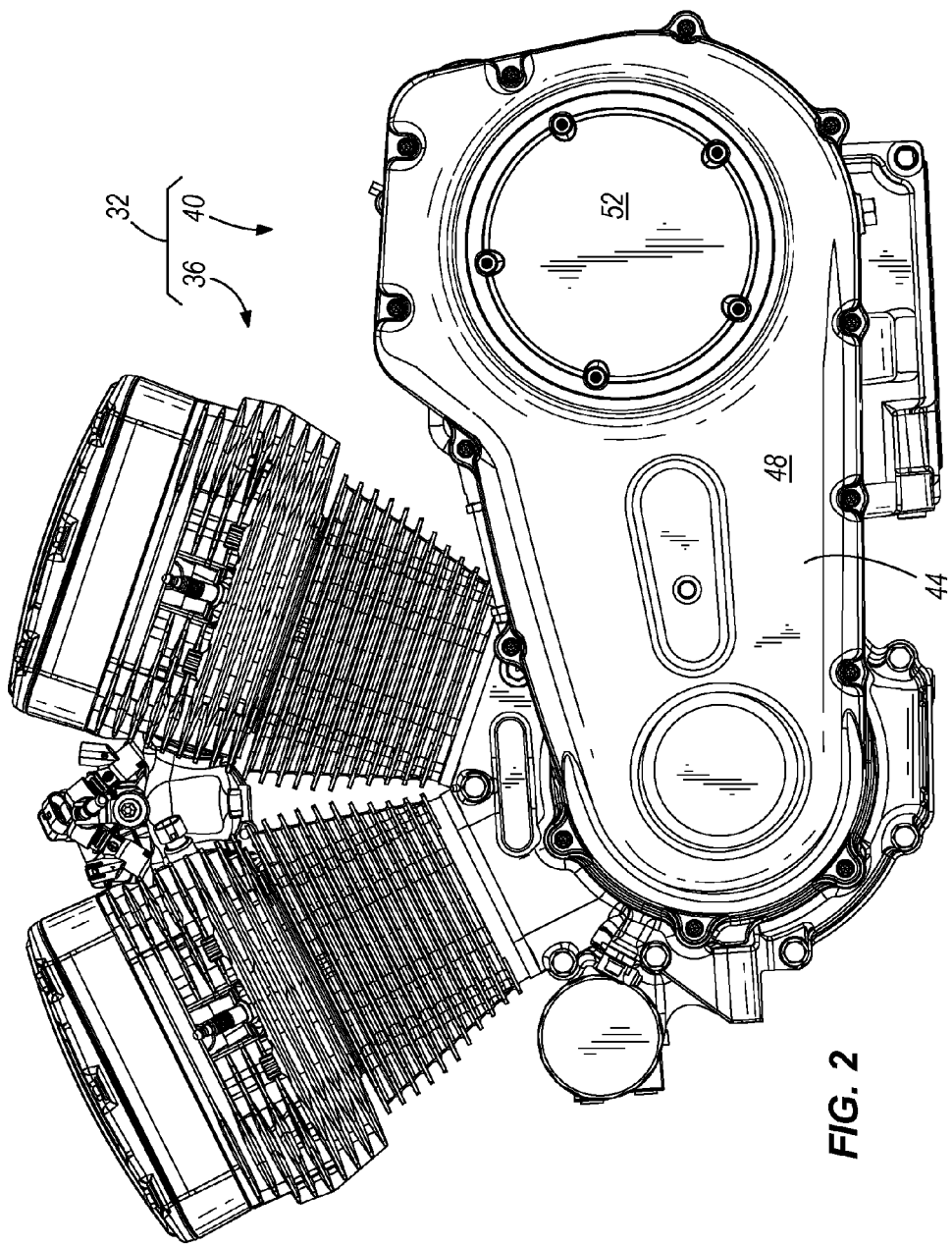
FIG. 2 is a left side view of an engine and transmission assembly of the motorcycle of FIG. 1.
Figure 3:
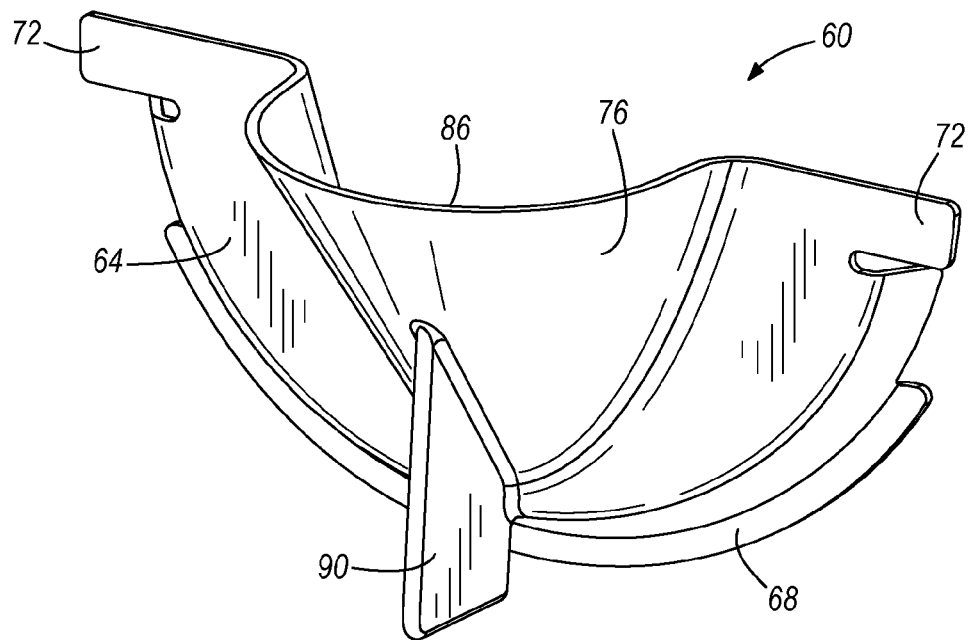
FIG. 3 is a front perspective view of a funnel according to one embodiment of the present invention.
Figure 4:
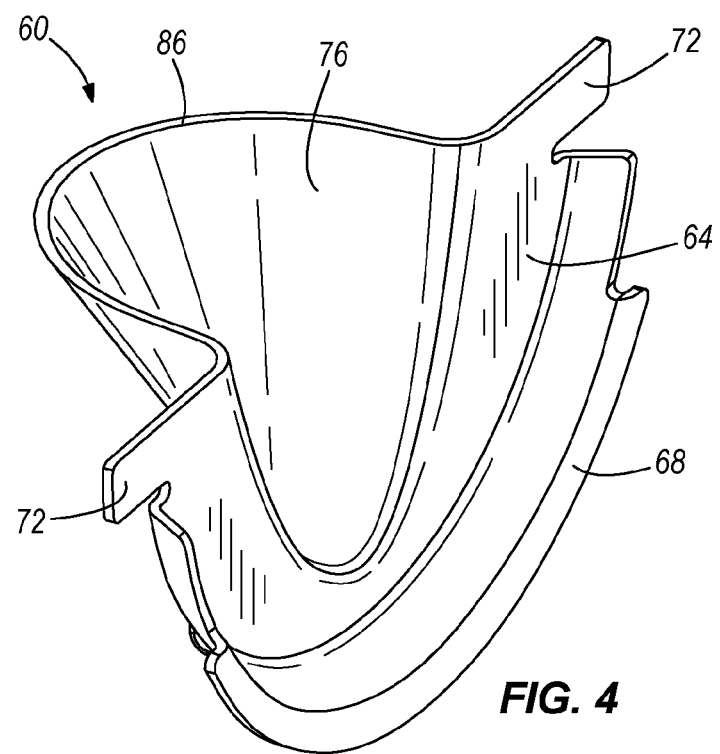
FIG. 4 is a rear perspective view of the funnel of FIG. 3.

FIG. 1 illustrates a motorcycle 20 having a frame 24, a pair of wheels 28, and an engine and transmission assembly 32. The engine and transmission assembly 32 is shown in FIG. 2, separate from the motorcycle 20. The engine and transmission assembly 32 includes a v-twin internal combustion engine 36 and a transmission 40 for driving the rear wheel 28 at various speed ratios relative to the engine speed. A primary drive (not shown) couples the output (i.e., a crankshaft) of the engine 36 with an input (i.e., main shaft) of the transmission 40. The primary drive may also include a clutch for selectively coupling and de-coupling the engine 36 and the transmission 40. The primary drive may be a chain drive apparatus including at least two sprockets and one endless chain that couples the sprockets so that a sprocket on the crankshaft may drive a sprocket of the clutch on the transmission main shaft. The primary drive is substantially enclosed on a side of the engine and transmission assembly 32 by a housing or primary case 44.

As shown in FIG. 2, the primary case 44 includes a side wall 48 and a cover 52 that is bolted to the side wall 48 to close an aperture 56 (FIGS. 9 and 10) in the side wall 48. The cover 52 (sometimes referred to as a "derby cover") provides selective access to the chamber defined by the primary case 44. The side wall 48 is substantially vertical or upright when the motorcycle is in an upright riding position. The side wall 48 may tilt slightly away from vertical, toward the ground, when the motorcycle 20 is at rest on a left-side stand. Due to the orientation of the aperture 56 in the side wall 48 of the primary case 44, problems can arise when attempting to insert oil into the primary case 44 through the aperture 56 in the side wall 48. Further details of the primary case 44 can be found in U.S. Pat. No. 7,174,875, which is incorporated in its entirety by reference herein, although other constructions are possible.

FIGS. 3-8 illustrate a funnel 60 including a main panel 64, a lip or engagement rim 68, and a plurality of engagement tabs 72. The main panel 64 is substantially flat except for a generally centrally-located spout 76, although other shape factors are optional. The spout 76 is half-funnel shaped, or in other words, it tapers from large to small in the downward direction but only provides a perimeter about half that of a conventional funnel of similar size. In the illustrated construction, the spout 76 forms substantially one-half of a cone (similar to one-half of a conventional conical funnel), which tapers down in cross-sectional area from the top end 80 of the funnel 60 toward a bottom end 82 of the funnel 60. The half-conical spout 76 is configured to provide a large upper area for receiving a flow of liquid, and the gradually-reducing area concentrates the flow of liquid into a desired area that is smaller than the large upper area. It should be understood that the spout 76 may alternately be formed in a shape other than conical. In some constructions, the main panel 64 may be formed as one large spout that is substantially bowl-shaped or quarter-sphere-shaped with no flat portions.

The funnel 60 is an open-sided funnel. In other words, the funnel 60 in its upright orientation (FIGS. 5-7) does not fully surround or enclose an area at any given vertical position along its height. Rather, the funnel 60 is open to both the top end 80 and a lateral side shown as lateral direction arrow A in FIG. 6. Particularly, the spout 76 includes an open mouth 86 at its top end, and the spout 76 is entirely open in the lateral direction A. Thus, the spout 76 defines a half-funnel-shaped receiving area that is open to the top and open in the lateral direction A. This makes the funnel 60 particularly useful for admitting liquid into a container in a lateral direction (e.g., through an aperture in a wall that is substantially vertical or upright). The open-sided shape of the funnel 60, along with other features described in further detail below, also make the funnel 60 particularly useful for placing directly into an aperture, such as the aperture 56 in the side wall 48 of the primary case 44.

Figure 5:
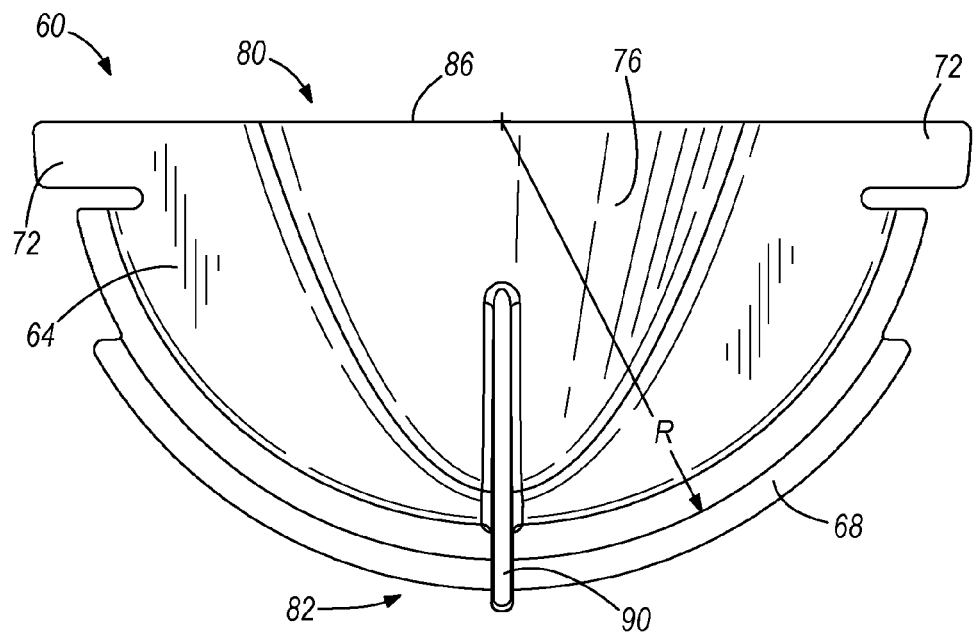
FIG. 5 is a front view of the funnel of FIG. 3.
Figure 6:
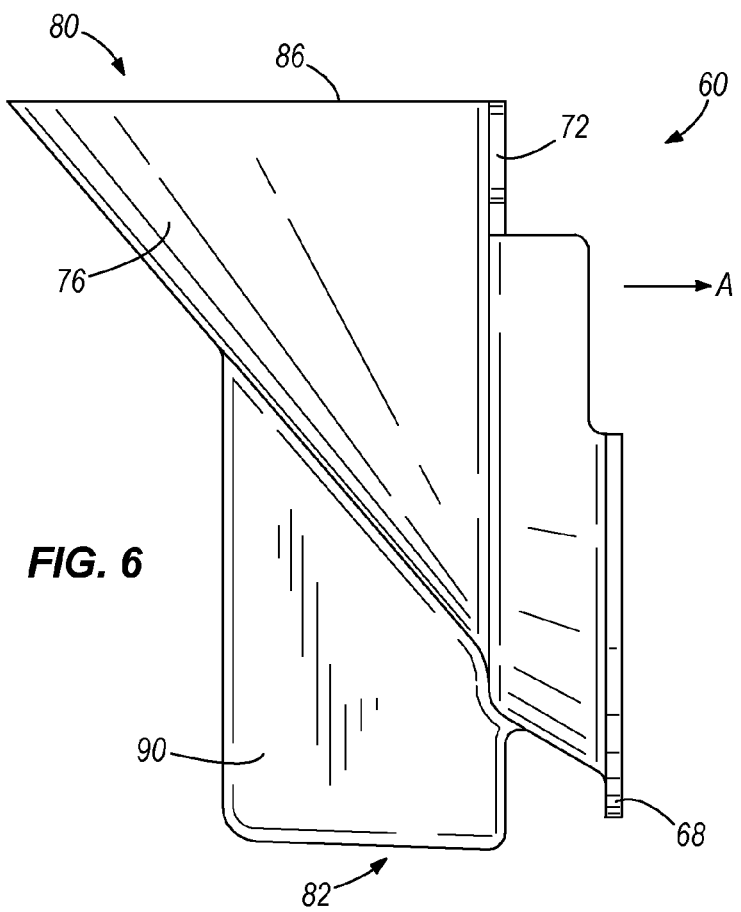
FIG. 6 is a side view of the funnel of FIG. 3.
Figure 7:
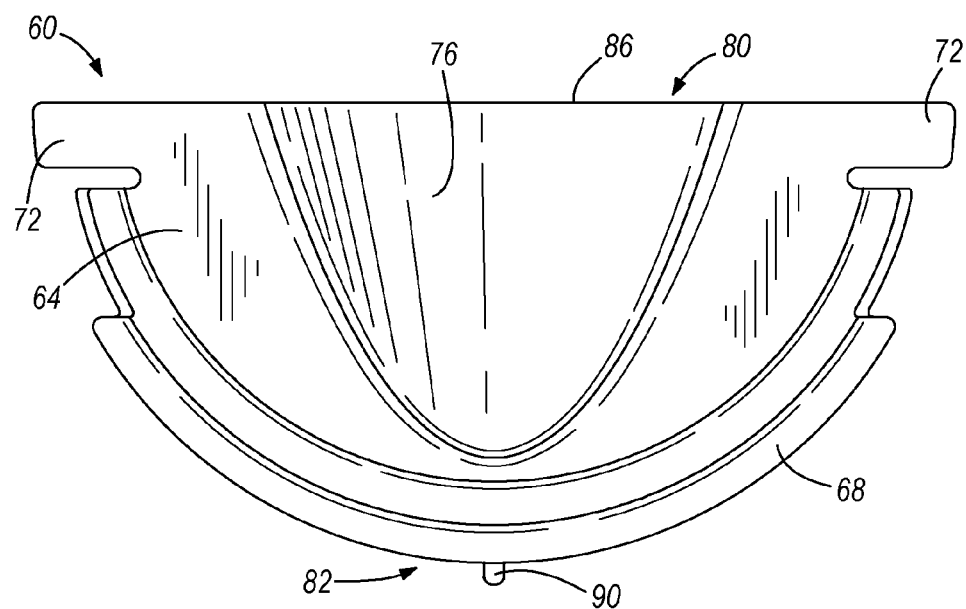
FIG. 7 is a rear view of the funnel of FIG. 3.
Figure 8:
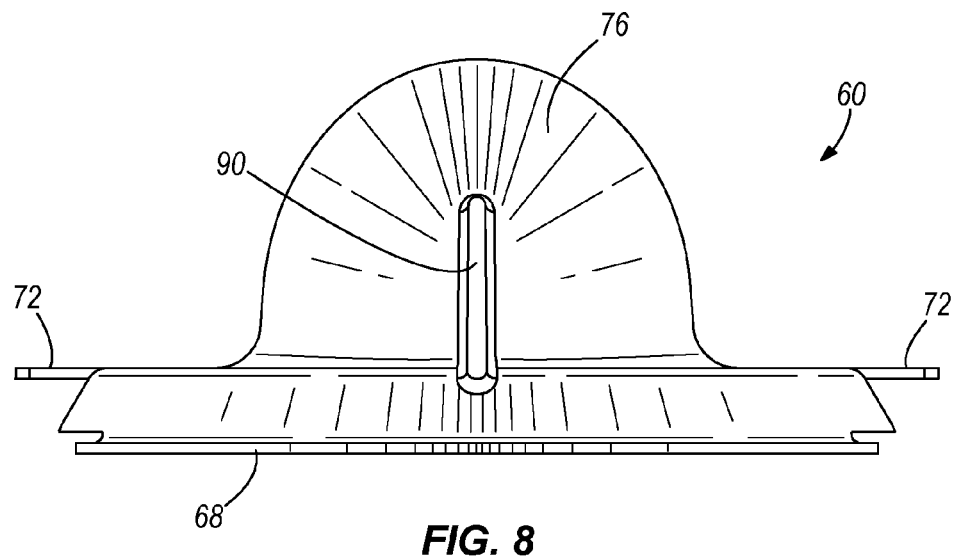
FIG. 8 is a bottom view of the funnel of FIG. 3.

The main panel 64 defines a perimeter from which the rim 68 and the tabs 72 project. The rim 68 extends from a continuous arc-shaped perimeter portion of the main panel 64 over an arc of about 90 degrees to about 180 degrees. In the illustrated construction, the rim 68 extends along an arc of about 120 degrees. At the location where the rim 68 projects from the arc-shaped perimeter portion of the main panel 64, the rim 68 and the main panel 64 jointly define a radius R, which is substantially the same as a radius of the aperture 56. The two tabs 72 project from the top of the main panel 64 in substantially opposite directions from each other, although alternate placements of the tabs 72 are possible. In addition to the two upper tabs 72, the funnel 60 includes a handle 90 that projects from an exterior side of the spout 76 in a direction substantially orthogonal to the main panel 64. The handle 90 provides a convenient location for a user to grasp and manipulate the funnel 60. As shown in FIGS. 5-7, the handle 90 extends downward past the perimeter of the main panel 64 which allows it to double as an engagement tab similar to the tabs 72, as discussed in further detail below.

Figure 9:
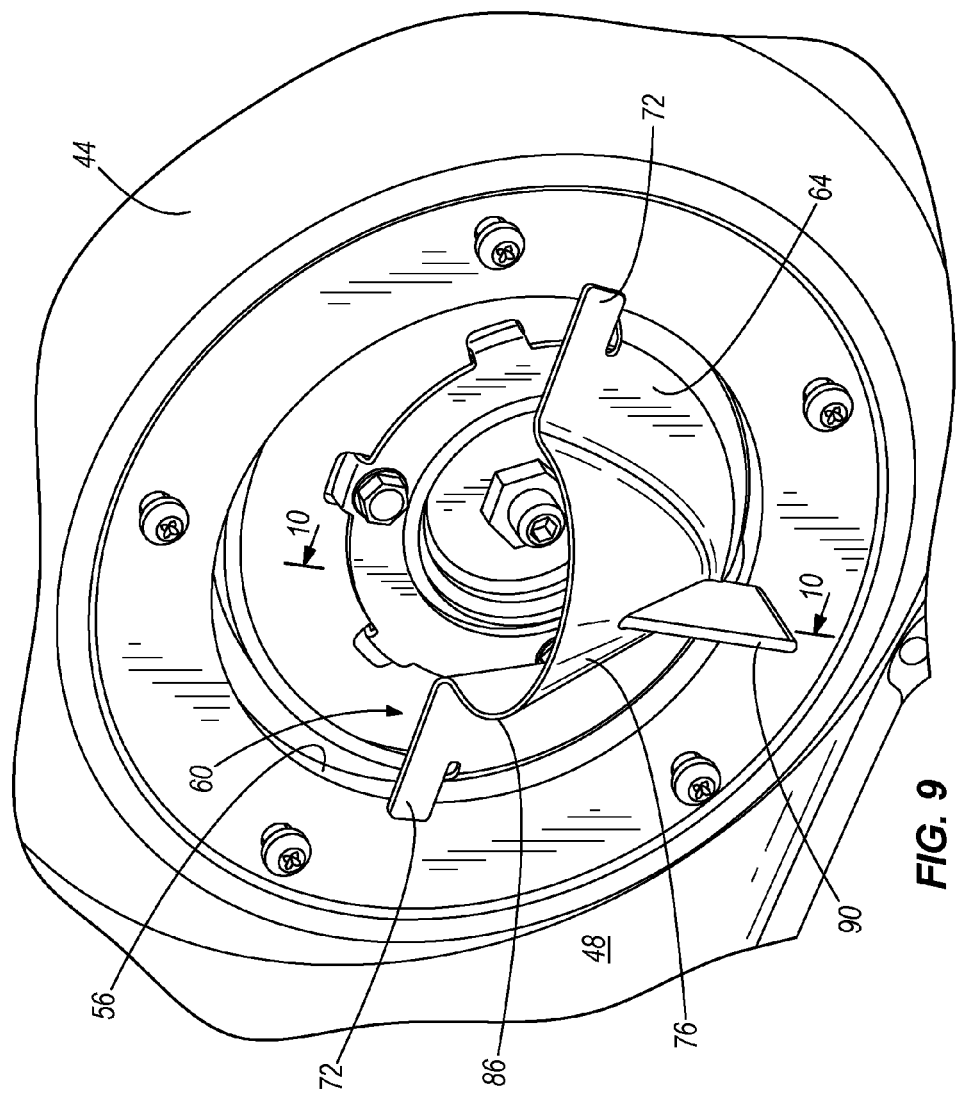
FIG. 9 is a perspective view of the motorcycle of FIG. 1 having the funnel of FIG. 3 coupled to the primary case thereof.

As shown in FIG. 9, the funnel 60 is dimensioned to be inserted into the aperture 56 in the side wall 48 of the primary case 44. The rim 68 extends through the aperture 56 to engage the interior of the primary case 44 adjacent the aperture 56. Once in place on the interior of the primary case 44, the rim 68 inhibits the funnel 60 from falling out of or away from the aperture 56. The tabs 72 engage the exterior of the primary case 44 adjacent the aperture 56 to inhibit the panel 64 and the spout 76 of the funnel 60 from passing through the aperture 56 into the primary case 44. The bottom portion of the handle 90 also serves as an exterior positioning tab, engaging the exterior of the primary case 44 adjacent the aperture 56. At the location of the handle 90, the side wall 48 of the primary case 44 is pinched or sandwiched between the handle 90 and the rim 68. The portion of the side wall 48 adjacent the handle 90 may be tightly compressed or loosely received between the handle 90 and the rim 68. Thus, the handle 90 may aide in securing the position of the funnel 60 in the aperture 56.

Figure 10:
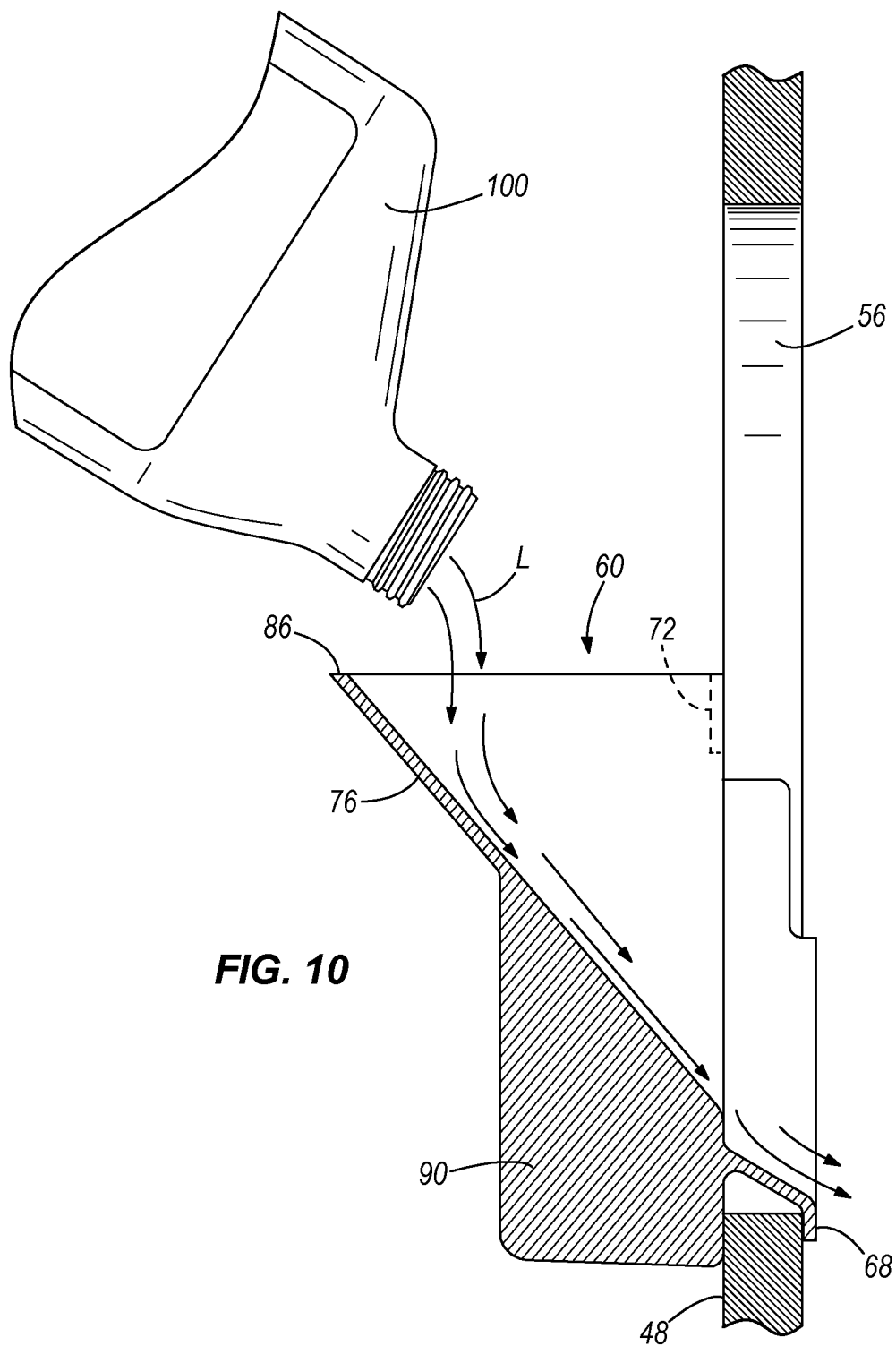
FIG. 10 is a cross-sectional view of the motorcycle and funnel, taken along line 10-10 of FIG. 9.

As shown in FIGS. 9 and 10, the funnel 60 obstructs the lower half of the aperture 56 (viewed perpendicular to the plane of the side wall 48 and the aperture 56) when placed into the aperture 56. The spout 76 is cupped or bowed outwardly away from the panel 64 and the aperture 56 so that the spout 76 provides a large receiving area for receiving a flow of liquid L that is poured downwardly from a container 100 at a position that is generally outward of the aperture 56 in the lateral direction as shown in FIG. 10. Therefore, the funnel 60 allows the flow of liquid L to be poured adjacent to the aperture 56 and laterally (and downwardly) directed into the aperture 56, especially in a situation where it may be difficult or impossible to pour the liquid directly into the aperture 56. Furthermore, the top half of the aperture 56 is left exposed and accessible even when the funnel 60 is in place as shown in FIGS. 9 and 10. Thus, the top end 80 of the funnel 60 (and therefore the widest portion of the spout 76—the mouth 86) is positioned substantially in line with the widest part of the aperture 56.

Unlike most conventional funnels, the open-sided funnel 60 is not necessarily designed to allow liquid to be poured into a particularly small aperture, but rather into an oddly-oriented aperture such as the aperture 56 that is placed in a substantially vertical or upright wall. As mentioned above, the frontal area of the funnel 60 (FIG. 5) is only about half the cross-sectional area of the aperture 56 for which the funnel is specifically configured. As shown in FIGS. 9 and 10, the funnel 60 is self-positioning within the aperture 56 by way of the rim 68, the tabs 72, and the handle 90 and need not be held in place while liquid is being poured into the aperture 56 with the funnel 60. Also, since the funnel 60 does not completely block or obstruct the aperture 56, liquid may be poured directly into the aperture 56 in certain circumstances. At the user's will, and within the constraints of gravity, liquid may be poured directly through the aperture 56 with the funnel 60 serving only as a back-up spill guard or shield. Regardless of whether the liquid is poured into the spout 76 or directly into the aperture 56, the funnel 60 inhibits the likelihood of spillage onto the outside of the primary case 44. Particularly, the rim 68 extending down below the edge of the aperture 56 along a significant lower portion of the aperture 56 inhibits any dripping of liquid onto the outside of the primary case 44.

In one construction, the cover 52 is removed from the primary case 44, and the motorcycle 20 receives the funnel 60 within the aperture 56 of the primary case 44, allowing oil to be poured into the primary case 44 as shown in FIG. 10. However, the funnel 60 is configured to work equally well with other liquids and with other containers having an upright or vertical wall with an aperture of radius R, which is the radius of the perimeter portion of the main panel 64. It is also noted that the aperture into which the funnel 60 is inserted for use is not limited to a circular aperture. In the illustrated construction, the funnel 60 is operable for use with any aperture having at least a semi-circular portion which has a radius about equal to R. Furthermore, the funnel 60 can maintain many of the above-described features while being formed to have an alternate perimeter shape and correspondingly-shaped rim 68 to meet the needs of a particular non-circular aperture.

Various features and advantages of the invention are set forth in the following claims.

What is claimed is:

1. An open-sided funnel for filling a container with liquid through an aperture, the open-sided funnel comprising:
   a panel including a fill spout;
   a rim disposed on a perimeter portion of the panel for engaging the interior of the container adjacent the aperture;
   a handle extending from a lower exterior portion of the panel, the handle including a portion adjacent the perimeter portion of the panel for engaging the exterior of the container adjacent the aperture; and a tab disposed on a perimeter portion of the panel for engaging the exterior of the container adjacent the aperture, wherein the fill spout defines a half-funnel-shaped receiving area that is open to a top side of the fill spout and to a lateral side of the fill spout.

2. The open-sided funnel of claim 1, wherein the rim is arc-shaped and extends along at least 90 degrees of an arc.

3. The open-sided funnel of claim 1, wherein the receiving area is generally shaped as a half-cone.

4. The open-sided funnel of claim 1, wherein the tab is one of two tabs positioned adjacent an upper edge of the panel, the two tabs extending away from the panel in opposite directions.

5. The funnel of claim 1, wherein the panel does not enclose any portion of the top side or the lateral side of the fill spout.

6. An open-sided funnel for filling a container with liquid through an aperture, the open-sided funnel comprising:
a panel including a liquid-receiving spout, the liquid-receiving spout defines a liquid-receiving area that is open to a top side of the liquid-receiving spout and to a lateral side of the liquid-receiving spout;
a lip disposed on a perimeter portion of the panel, the lip defining a radius and extending along an arc of between about 90 degrees and about 180 degrees and configured to extend through the aperture of substantially the same radius so that the lip rests against an interior edge of the aperture; and
a tab extending from the panel adjacent the lip, the tab configured to inhibit the panel from passing through the aperture into the container,
wherein the panel is configured to obstruct the lower half of the aperture when viewed in a direction perpendicular to the aperture and the panel does not enclose any portion of the top side or the lateral side of the liquid-receiving spout.

7. The open-sided funnel of claim 6, wherein the liquid-receiving area is generally shaped as a half-cone.

8. The open-sided funnel of claim 6, wherein the tab is one of a plurality of tabs, including two tabs positioned adjacent an upper edge of the panel, the two tabs extending away from the panel in opposite directions.

9. The open-sided funnel of claim 6, further comprising a handle extending from a lower exterior surface of the panel.

10. A motorcycle comprising:
a frame;
an engine and transmission assembly supported by the frame;
a container configured to contain a liquid during operation of the engine, the container having an aperture in a side wall thereof; and
an open-sided funnel for filling the container with the liquid through the aperture, the open-sided funnel including:
a panel including a fill spout,
an arc-shaped rim disposed on a perimeter portion of the panel and engaged with the interior of the container adjacent the aperture, and
a plurality of tabs, each one of the plurality of tabs disposed on a perimeter portion of the panel and engaged with the exterior of the container adjacent the aperture,
wherein the fill spout defines a half-funnel-shaped receiving area that is open to a top side of the fill spout and to a lateral side of the fill spout.

11. The motorcycle of claim 10, wherein the rim extends along at least 90 degrees of an arc.

12. The motorcycle of claim 10, wherein a frontal area of the panel is about half the cross-sectional area of the aperture.

13. The motorcycle of claim 10, wherein the receiving area is generally shaped as a half-cone.

14. The motorcycle of claim 10, wherein the plurality of tabs include two tabs positioned adjacent an upper edge of the panel, the two tabs extending away from the panel in opposite directions.

15. The motorcycle of claim 10, further comprising a handle extending from a lower exterior portion of the panel.

16. The motorcycle of claim 15, wherein the handle doubles as one of the plurality of tabs.

17. The motorcycle of claim 10, wherein the container is a primary case that contains a primary drive, the primary case being coupled to the engine transmission assembly and configured to receive oil via the aperture and the open-sided funnel.

18. The motorcycle of claim 10, wherein the panel does not enclose any portion of the top side or the lateral side of the fill spout.

19. A funnel for filling a container with liquid through an aperture in a side wall of the container, the funnel comprising:
a panel including a fill spout;
a rim disposed on a lower edge of the panel and adapted to engage a lower inner surface of the side wall; and
a tab extending from the panel and adapted to engage an outer surface of the side wall,
wherein the fill spout defines a half-funnel-shaped receiving area that is open to a top side of the fill spout and to a lateral side of the fill spout, the panel does not enclose any portion of the top side or the lateral side of the fill spout.

20. The funnel of claim 19, wherein the rim is arc-shaped and extends along at least 90 degrees of an arc.

21. The funnel of claim 19, wherein the tab is one of two tabs positioned adjacent an upper edge of the panel, the two tabs extending away from the panel in opposite directions.

22. The funnel of claim 19, wherein the tab extends from a lower portion of the panel and extends substantially perpendicularly from the panel to form a handle.

23. The funnel of claim 19, wherein the spout does not extend substantially beyond the rim.

* * * * *